US010592873B2

(12) United States Patent
Russinovich

(10) Patent No.: US 10,592,873 B2
(45) Date of Patent: Mar. 17, 2020

(54) EDIT TRANSACTIONS FOR BLOCKCHAINS

(71) Applicant: Microsoft Technology Licensing, LLC, Redmond, WA (US)

(72) Inventor: Mark Russinovich, Hunts Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 15/985,047

(22) Filed: May 21, 2018

(65) Prior Publication Data

US 2019/0354944 A1 Nov. 21, 2019

(51) Int. Cl.
*G06Q 20/08* (2012.01)
*G06Q 20/06* (2012.01)

(52) U.S. Cl.
CPC .................. *G06Q 20/065* (2013.01)

(58) Field of Classification Search
USPC ............................................. 705/39, 35, 1.1
See application file for complete search history.

(56) References Cited

U.S. PATENT DOCUMENTS

| 9,774,578 | B1 * | 9/2017 | Ateniese | G06F 3/0619 |
| 9,785,369 | B1 * | 10/2017 | Ateniese | G06F 3/0619 |
| 9,998,286 | B1 * | 6/2018 | Ramathal | G06Q 10/10 |
| 2014/0249972 | A1 | 9/2014 | Thuneby et al. | |
| 2017/0338957 | A1 * | 11/2017 | Ateniese | G06F 3/0619 |
| 2018/0032273 | A1 * | 2/2018 | Ateniese | G06F 3/0619 |
| 2018/0039667 | A1 * | 2/2018 | Pierce | G06Q 20/0658 |
| 2018/0083786 | A1 | 3/2018 | Dierks et al. | |
| 2018/0260125 | A1 * | 9/2018 | Botes | G06F 3/0617 |
| 2019/0058709 | A1 * | 2/2019 | Kempf | H04L 63/0876 |
| 2019/0155513 | A1 * | 5/2019 | Maeda | H04L 43/106 |
| 2019/0182028 | A1 * | 6/2019 | Arquero | H04L 9/3297 |
| 2019/0199512 | A1 * | 6/2019 | Pentland | H04L 9/3239 |

FOREIGN PATENT DOCUMENTS

WO 2018026883 A1 2/2018

OTHER PUBLICATIONS

The Blockchain Immutability Myth Posted May 4, 2017 by Gideon Greenspan (Year: 2017).*
Bitcoin: A Peer-to-Peer Electronic Cash System Satoshi Nakamoto (Year: 2009).*

(Continued)

*Primary Examiner* — William E Rankins
(74) *Attorney, Agent, or Firm* — Davin Chin; Chin IP, PLLC

(57) ABSTRACT

The disclosed technology is generally directed to blockchain technology. In one example of the technology, a modified block is provided in response to at least an edit transaction that indicates a transaction in an original block in a blockchain. The modified block includes: transactions of the original block except the indicated transaction, a hash of the indicated transaction, and a header that includes a link to a hash of a block that precedes the original block. A new block is provided. The new block includes a reference associated with the edit transaction, and that the reference may include a link to the modified block. The original block may be caused to be deleted.

20 Claims, 8 Drawing Sheets

(56) References Cited

OTHER PUBLICATIONS

Blockchain Governance: Programming Our Future Fred Ehrsam Nov. 27, 2017 (Year: 2017).*

Matzutt, et al., "A Quantitative Analysis of the Impact of Arbitrary Blockchain Content on Bitcoin", In Proceedings of the 22nd International Conference on Financial Cryptography and Data Security, Feb. 26, 2018, 18 Pages.

Meyer, David, "Blockchain is on a collision course with EU privacy law", Retrieved From https://thenextweb.com/syndication/2018/03/26/blockchain-collision-course-eu-privacy-law/, Mar. 26, 2018, 9 Pages.

Hardjono, et al., "Anonymous Identities for Permissioned Blockchains", Retrieved From: https://web.archive.org/web/20170929141728/http://www.the-blockchain.com/docs/MIT-ChainAnchor-DRAFT.pdf, Jan. 24, 2016, 16 Pages.

"International Search Report and Written Opinion Issued in PCT Patent Application No. PCT/US2019/030793", dated Aug. 6, 2019, 12 Pages.

* cited by examiner

EDIT TRANSACTIONS FOR BLOCKCHAINS

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. Blockchain systems have also been used for the implementation of smart contracts to automate transactions on the blockchain, including triggering clauses upon specified conditions being met.

A key characteristic of prior blockchain implementations is that blockchains have been immutable, e.g., transactions on these prior blockchains cannot be changed. Among other things, such immutability of prior blockchains is an important characteristic in terms of auditability. If transactions on these prior blockchains could be altered, the integrity of the blockchain would be destroyed and the cryptographic techniques for verifying the blockchain transaction would not function as designed.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to blockchain technology. In one example of the technology, a modified block is provided in response to at least an edit transaction that indicates a transaction in an original block in a blockchain. In some examples, the modified block includes: transactions of the original block except the indicated transaction, a hash of the indicated transaction, and a header that includes a link to a hash of a block that precedes the original block. In some examples, a new block is provided. The new block may include a reference associated with the edit transaction, and the reference may include a link to the modified block. In some examples, the original block is caused to be deleted.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
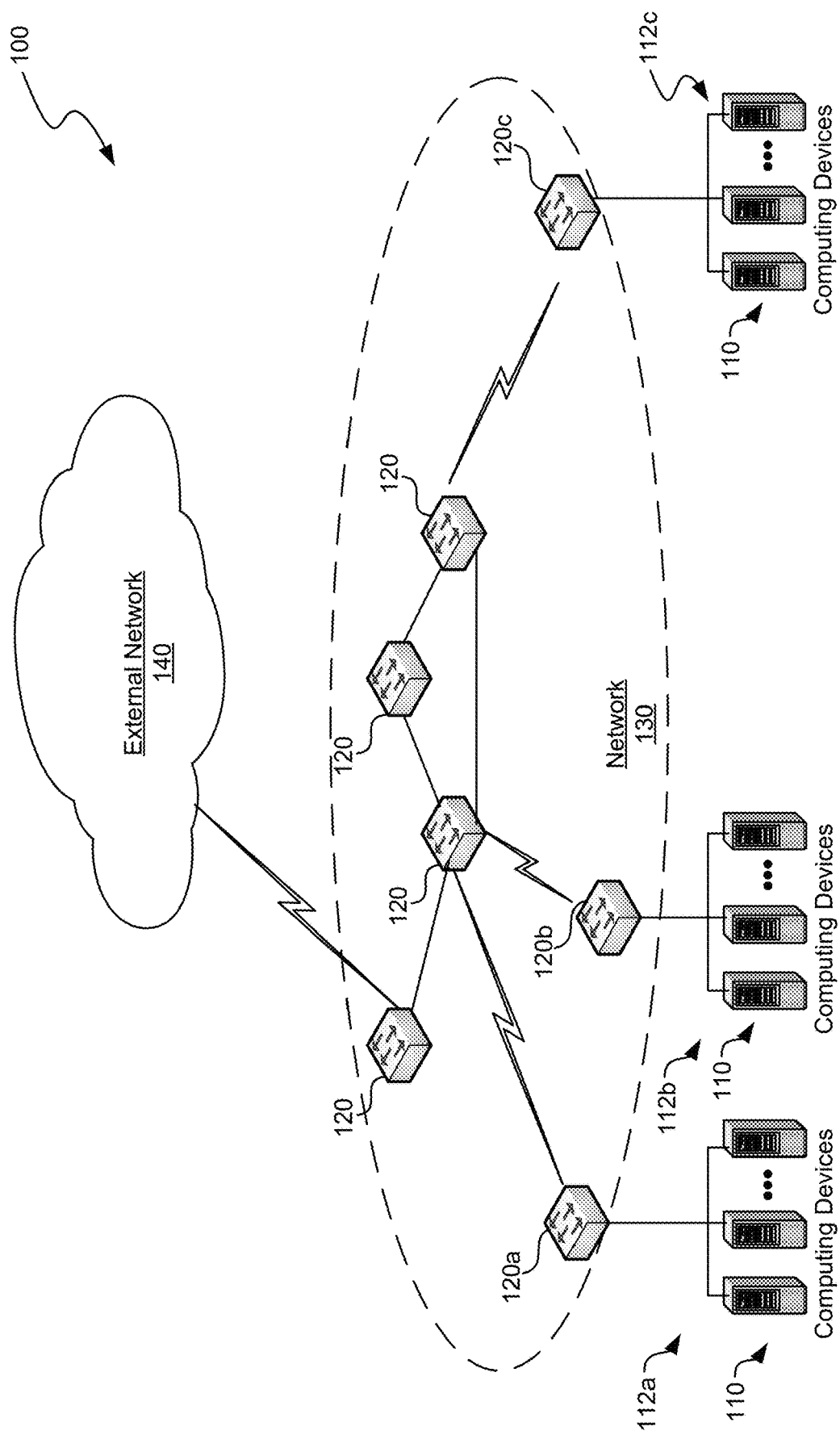
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to blockchain technology. In one example of the technology, a modified block is provided in response to at least an edit transaction that indicates a transaction in an original block in a blockchain. In some examples, the modified block includes: transactions of the original block except the indicated transaction, a hash of the indicated transaction, and a header that includes a link to a hash of a block that precedes the original block. In some examples, a new block is provided. The new block may include a reference associated with the edit transaction, and the reference may include a link to the modified block. In some examples, the original block is caused to be deleted.

In some examples, an edit transaction (ETX) may be used for editing blockchains. The edit transaction may interchangeably be referred to as an edit transaction, edit blockchain transaction, or ETX. The ETX may specify one or more transactions already on the chain to be edited.

In some examples, in response to a miner, e.g., a blockchain node that creates new blocks, determining that an ETX is valid, the miner creates modified versions (MBs) of each original block (OB) to be edited, as well as a standard new block (NB) that includes any other standard transactions to be mined by the miner. The determination that the ETX is valid may be a determination that the ETX is both correctly formed and that the network's governance system agrees to the edit.

In some examples, the MB contains a special transaction that contains an exact copy of the OB, with edited version(s) of the transaction(s). In some examples, the special transaction in the MB includes the hash of the original transaction instead of the edited transaction. The MB also contains the merkle root of the OB. The MB may also include its own header, which includes a link to the hash of the block that precedes the OB in the chain, so that the chain can be traversed from the MB to the block that preceded the OB. In some examples, a reference in the NB links to the MB so that the chain is traversed from to the MB rather than the OB. In some examples, the OB is subsequently deleted.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
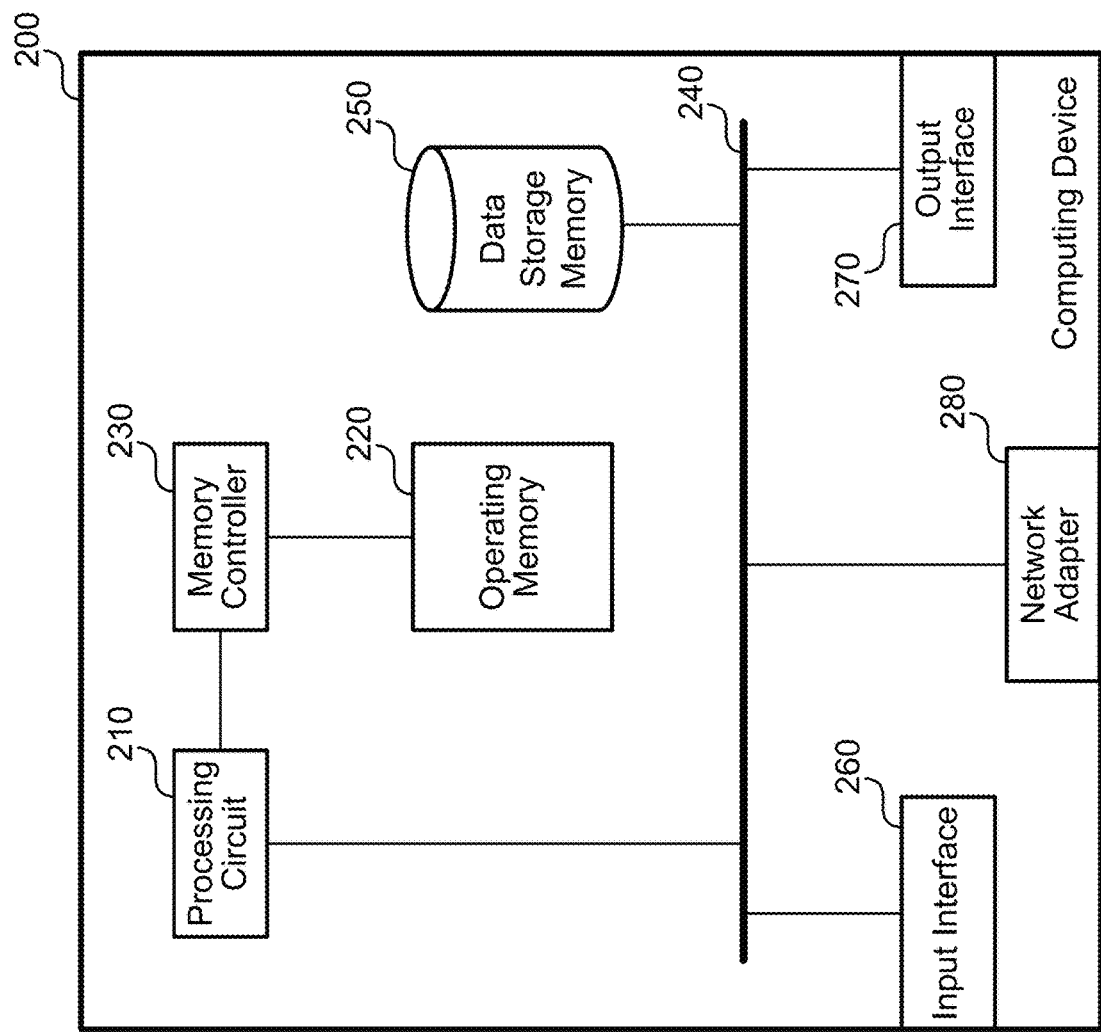
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices, nodes, members, or other entities illustrated in or referred to in various figures, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions.

Illustrative Systems

Figure 3:
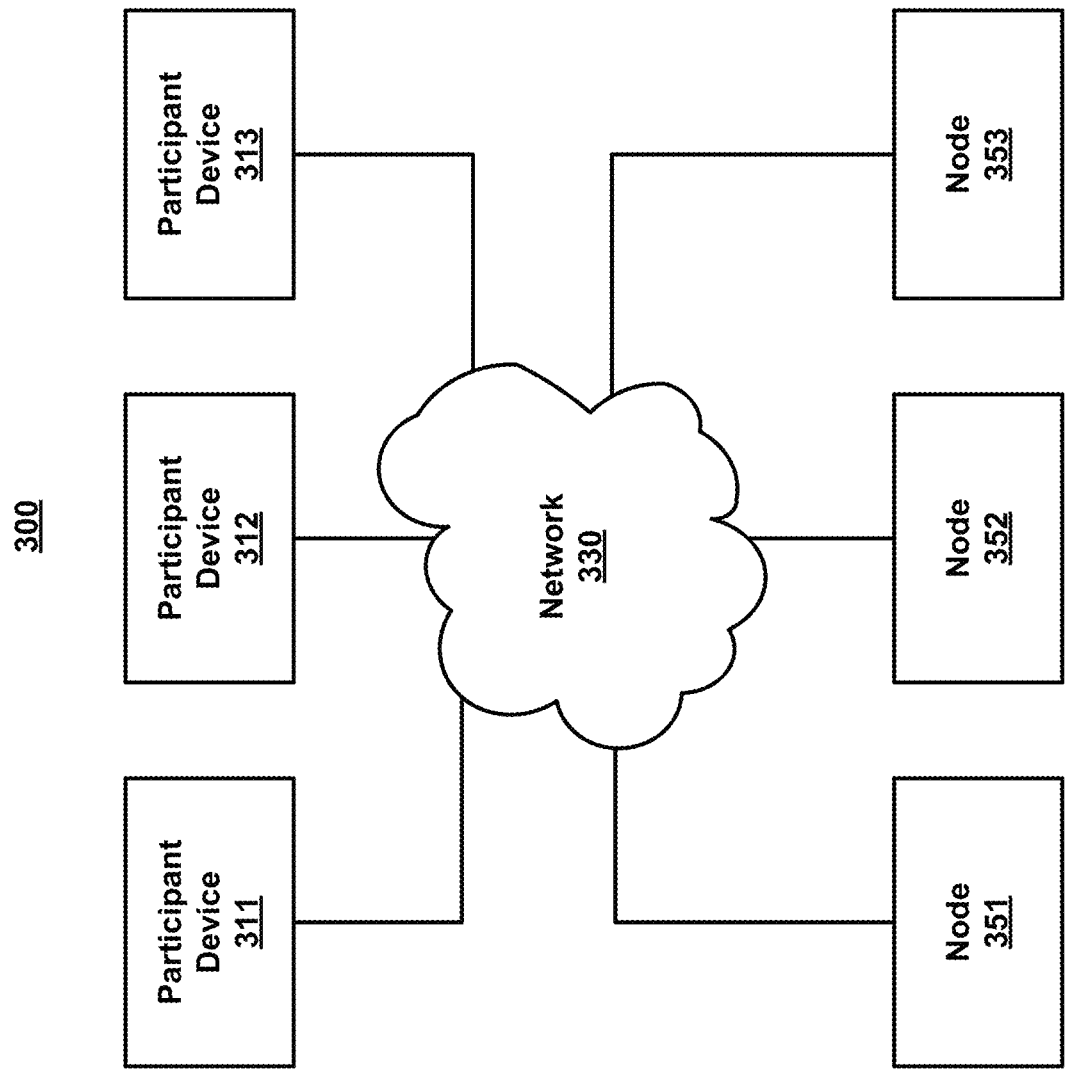
FIG. 3 is a block diagram illustrating an example of a system.

FIG. 3 is a block diagram illustrating an example of a system (300) for a blockchain consortium. System 300 may include network 330, blockchain nodes 351-353, and participant devices 311-313.

Each of the participant devices 311-313, and/or blockchain nodes 351-353 may include examples of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication method by which information may travel between blockchain nodes 351-353, and participant devices 311-313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

In some examples, participant devices 311-313 are devices used by participants to communicate over network 330, such as to request a transaction.

In some examples, blockchain nodes 351-353 are devices that, during normal operation, validate and process submitted blockchain transactions, and execute chaincode. A blockchain node that is creating new blocks is referred to as a miner. In some examples, a miner is capable of performing blockchain edits in response to an edit transaction, upon verification of the edit transaction, as discussed in greater detail below.

System 300 may include more or less devices than illustrated in FIG. 3, which is shown by way of example only.

Figure 4A:
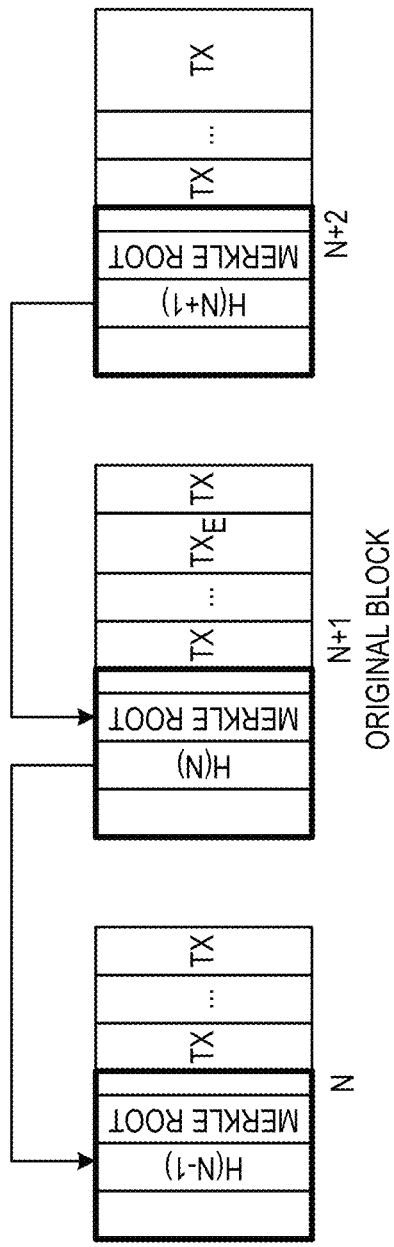
FIGS. 4A and 4B illustrate an example of a blockchain edit.
Figure 4B:
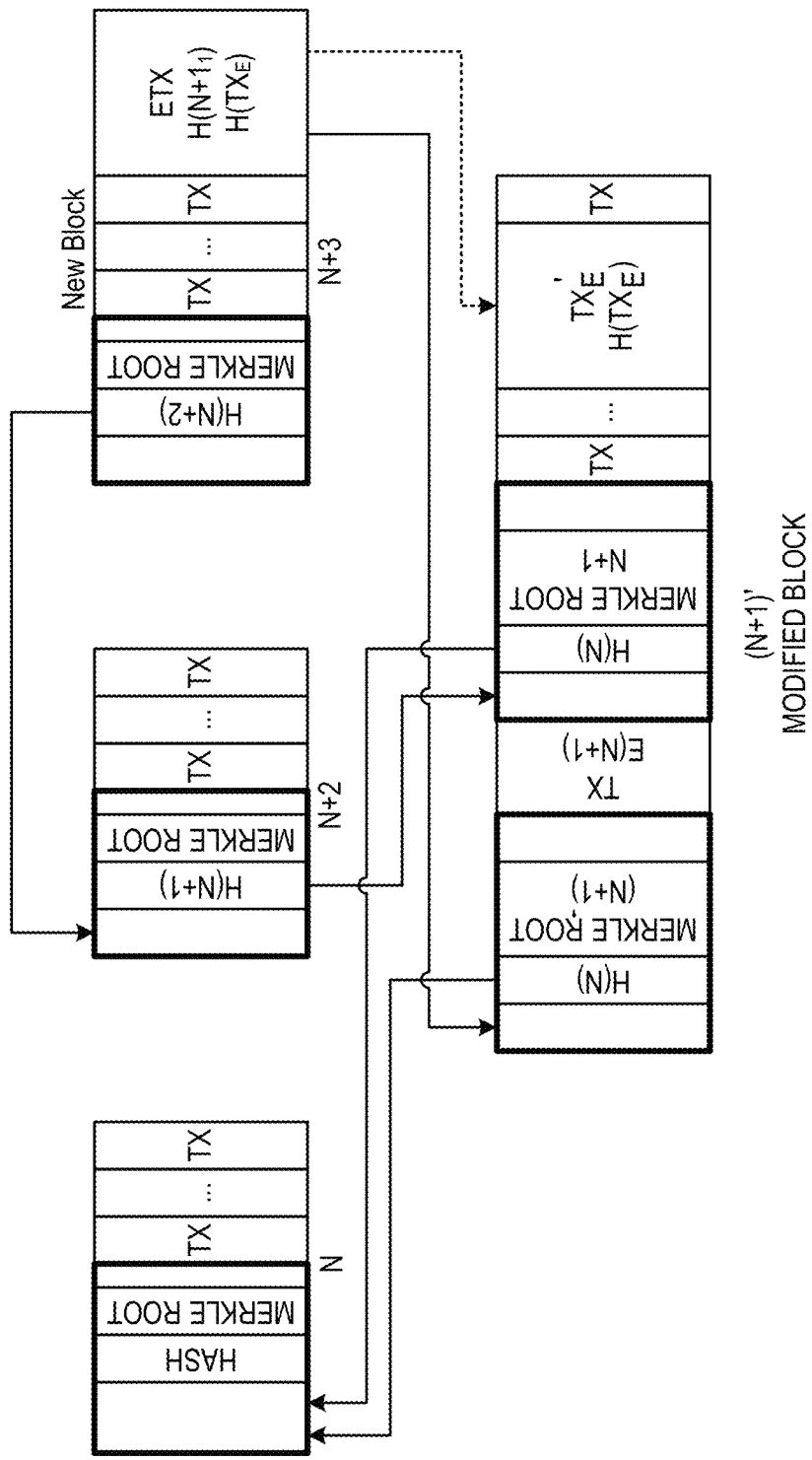

FIGS. 4A and 4B illustrate an example of a blockchain edit. FIG. 4A illustrates an example of the original block (OB) to be edited by an edit transaction (ETX) on its original blockchain. In this example, the OB is block N+1. FIG. 4A also illustrates an example of the block preceding the OB in the blockchain (block N) and a block (block N+2) that includes an ETX transaction to edit the OB.

FIG. 4B shows an example of the result after the ETX is performed, where a modified block (MB) of the OB, as the modified version of block N+1 (N+1)' is created, along with a new block (N+3) including a reference to the edit transaction.

Blockchains may have several characteristics that make them valuable foundations for many scenarios, including decentralized operation, security, and immutability. Immutability may be a double-edged sword, however. A blockchain's cryptographic linkage of transactions may mean that any modification to existing records destroys the integrity of the chain and is immediately apparent. However, there can be legitimate requirements for removal of data from a blockchain. Privacy regulations like General Data Protection Regulation (GDPR) may present a legal requirement to be able to delete personally-identifiable information (PII) on-request. While blockchain architectural guidance recommends storing any PII off-chain, that can add significant complexity to a design and undermine the properties that building on a blockchain strives to provide.

Further, blockchains, even ones with limited capabilities for storing arbitrary data, may be susceptible to the storage of illicit, questionable, and even illegal content. Researchers recently discovered that the public Bitcoin blockchain (BTC) stores encoded images of child pornography and dark-web links to sites hosting such images. Even in tightly controlled private and consortium blockchains where there is little of risk of questionable content, it may be desirable to remove data that was inadvertently placed on the chain. The blockchain may also include errors.

The agreement by the network as to what content should be deleted may vary in various example. In some examples, the network uses a trusted central authority such as a government agency, consortium of stakeholders, or independent entity created solely for that purpose. For example, an international group of organizations involved with expertise in identifying child pornography could submit edit requests to the network that mining nodes would honor because of their origin.

In some examples, the network votes to agree to proposed edits using built-in capabilities like smart contracts. The approach that a network takes may vary based on the network's governance model, and can even vary within a network based on the types of content deemed editable.

In some examples, an edit transaction (ETX) specifies one or more transactions already on the chain to be edited, such as by, in some examples, listing the hashes of the transaction(s) to be edited in the body of the ETX transaction. Some examples of ETX transactions may also be capable of deleting transaction outputs. Further, in some examples, there may be types of edit transactions that request deletion of a smart contracts or inputs to smart contract requests.

To ensure that smart contract state remains intact after an edit, the edit protocol can include one or more snapshot(s) of impacted state in the edited transaction that is stored in the MB. A node could calculate a smart contract's state by executing the smart contract using its transaction inputs up to the edited transaction, then merging the calculated smart contract state with the snapshot.

In the example illustrated in FIG. 4A, the original block (OB) includes a transaction to be edited that is denoted $TX_E$, with the other, non-edited transactions denoted TX. The OB may also include a hash of its preceding block H(N), and a merkle root.

An edit transaction (ETX) may be received to edit block $TX_E$ in original block OB. First, in some examples, a miner determines whether the ETX transaction is valid. The determination that ETX transaction is valid may be a determination that the ETX is both correctly formed and that the network's governance system agrees to the edit. Upon determining that the ETX is valid, in some examples, the miner creates modified versions (MB) of each original block (OB) to be edited, as well as a new block (NB) that includes a reference to the ETX transaction, as shown in FIG. 4B. In some examples, the miner mines both the MBs and NB together, meaning that if the consensus protocol is proof-of-work, the hashes of both the MB and NB headers are both included in the reference.

In some examples, the MB structure differs from that of any type of block other than another MB. In some examples, the MB contains a special transaction that contains an exact copy of OB, with edited version(s) of the edited transaction(s). In the place of any edited transaction, in some examples, the MB includes the hash of the original transaction. In order to recreate the integrity of the chain, in some examples, the MB has its own header which links it to the hash of the block (block N) preceding the edited block, and that includes the merkle root of the MB itself.

Figure 5A:
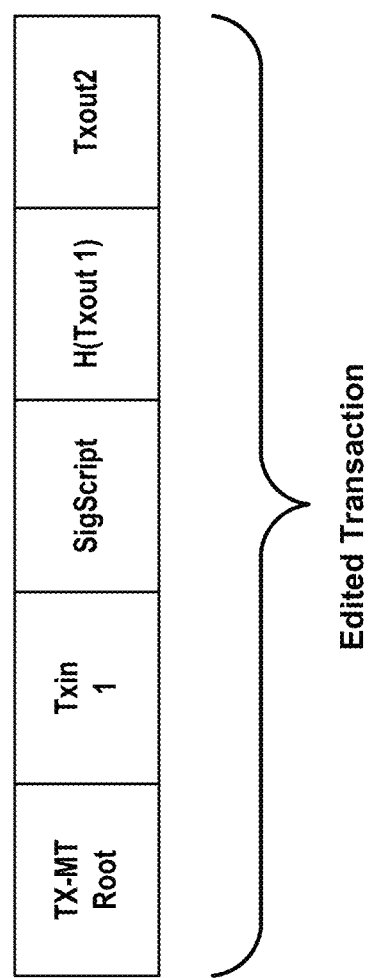
FIG. 5A illustrates an example of an edited transaction.

The MB may also include the header from OB, including the hash of the block preceding the original block H(N) and the merkle root of the OB. In some example, an edited transaction, such as depicted in FIG. 5A, includes the original portions of the transaction, plus the hashes of the fields that are deleted. Using the hashes in the MB along with dynamically-calculated hashes of the other transactions, in some examples, other nodes can recreate the original merkle tree root of edited and original transactions, use those recreated transaction merkle tree roots to recreate the merkle tree root of the MB, and compare the calculated block root with the one stored in the OB header that is included in the MB. In some examples, a match means the node can validate the edit, e.g., by determining what data was modified or deleted, and by validating that the edited information is only that which is specified in the ETX.

As discussed above, in some examples, in order to recreate the integrity of the chain, the MB has its own header which links it to the hash of the block (block N) preceding the edited block, though proof-of-work checks cannot be performed solely on an MB, but require all the MBs and NB since they are mined together. An example of the reference in the NB includes hashes of the MBs to strongly link the NB to the corresponding MB, but the NB header links to the most recent block like any other block being added to the chain.

In some examples, a node that receives a NB validates that the blocks are valid and that it approves of the edits according to the governance policies it adheres to, as follows in some examples.

First, the node checks that consensus prerequisites are met. For example, in the case of Bitcoin and Ethereum, this involves checking that the combined hashes of the NB and MBs demonstrate the required amount of work (the hash is smaller than the current network target). In addition to validating the standard transactions in the NB, and that the NB header includes the hash of the most recent block, the node validates that the transaction hashes match transactions that are in the OBs corresponding to the MBs. Then, the node validates that the copied versions of the OBs in the MBs differ only by the approved edits of the target transactions. The node also validates that the hash stored in edited transactions, in combination with the hashes of the other transactions in the MB, result in the merkle root value stored in the OB header (of which there is a copy in the MB). In response to completing these validations, the node accepts the NB as the highest block, and the MBs as the edits of the OBs. The node may then delete the OBs.

In some examples, nodes that bootstrap after MBs have been accepted by the network will not see OBs, only MBs. In some examples, when such nodes request an MB from the network, the network responds with the NB that points at it, as well as the other MBs referenced by that NB. In some examples, that enables the node to validate the blocks that make up the edit. In some examples, if the node receives an OB for which there is an MB, the node cannot determine whether the network majority agrees to the MB, the node accepts the OB. For MBs that the network majority accepted, in some examples, the node will eventually construct a chain built on the MBs that has more work than any minority fork that does not include the MBs. Accordingly, in some examples, network consensus for chains with MBs is identical to standard consensus based on the longest chain (chain that demonstrates the most work) winning.

Figure 5B:
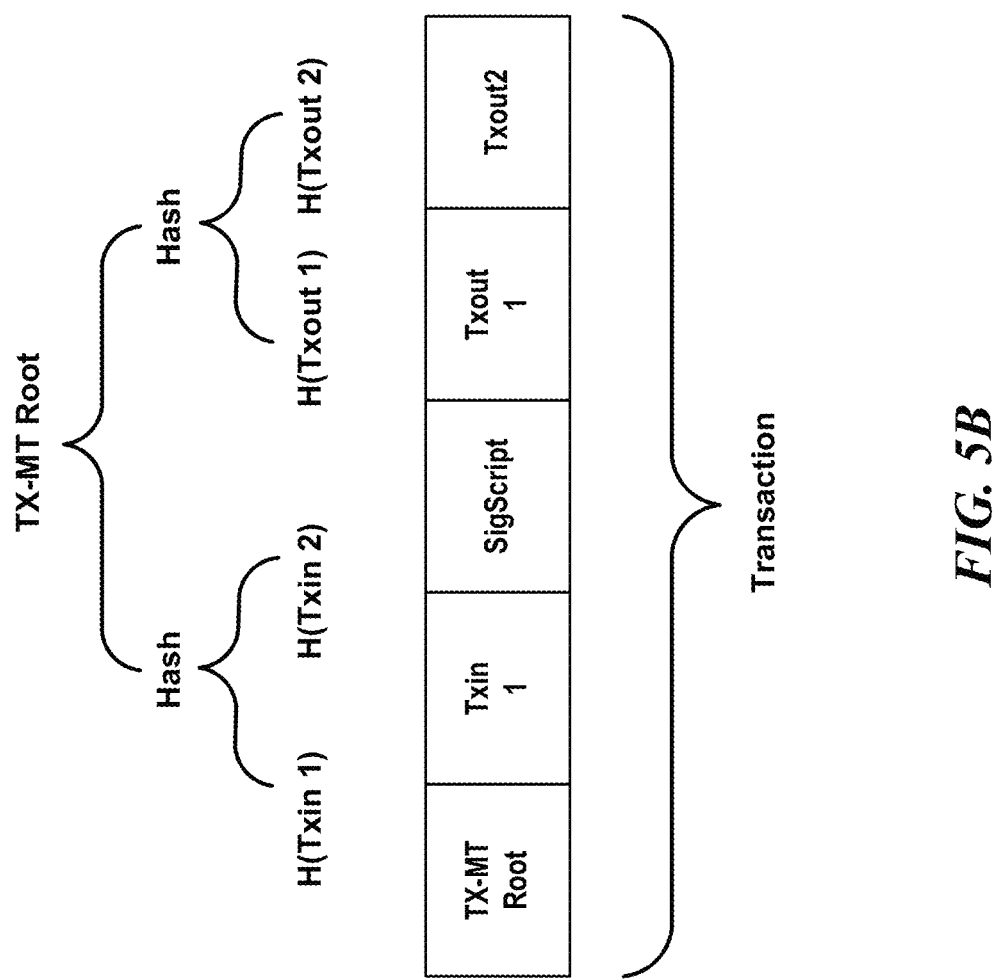
FIG. 5B illustrates an example of transaction and associated merkle root.

FIG. 5B illustrated a blockchain that supports an edit protocol that hashes individual transaction fields and creates a transaction merkle tree (TX-MT) from the hashes. Such a blockchain may accommodate targeted deletion of specific transaction fields. For example, such a blockchain may be used if only a subset of the outputs are invalid and others represent legitimate transfers referenced in derivative transactions that should be preserved.

The network may use a transaction's TX-MT root as the transaction's hash and ID. This should increase the number of hashes that execute when validating a blockchain by O(10) on a typical network where transactions have O(10) inputs and outputs for each transaction. This approach to deriving transaction hashes enables an ETX to specify which portions of a transaction are edited by storing the merkle tree root of the transaction, as well as the hashes of edited transaction fields, e.g., in the body of the ETX.

The protocol discussed above may be used for any suitable blockchain, including public, private, and consortium blockchains.

The example protocol discussed above may enable the editing of existing blockchain blocks, while preserving the integrity of the blockchain for edits approved by a network majority. Some examples of the protocol build on common blockchain structures and so can be incorporated into existing ledgers, such as Bitcoin and Ethereum. Various examples of the protocol work not only for private networks that honor consortium governance, but also public networks where the majority of mining nodes agree to an edit request.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 6:
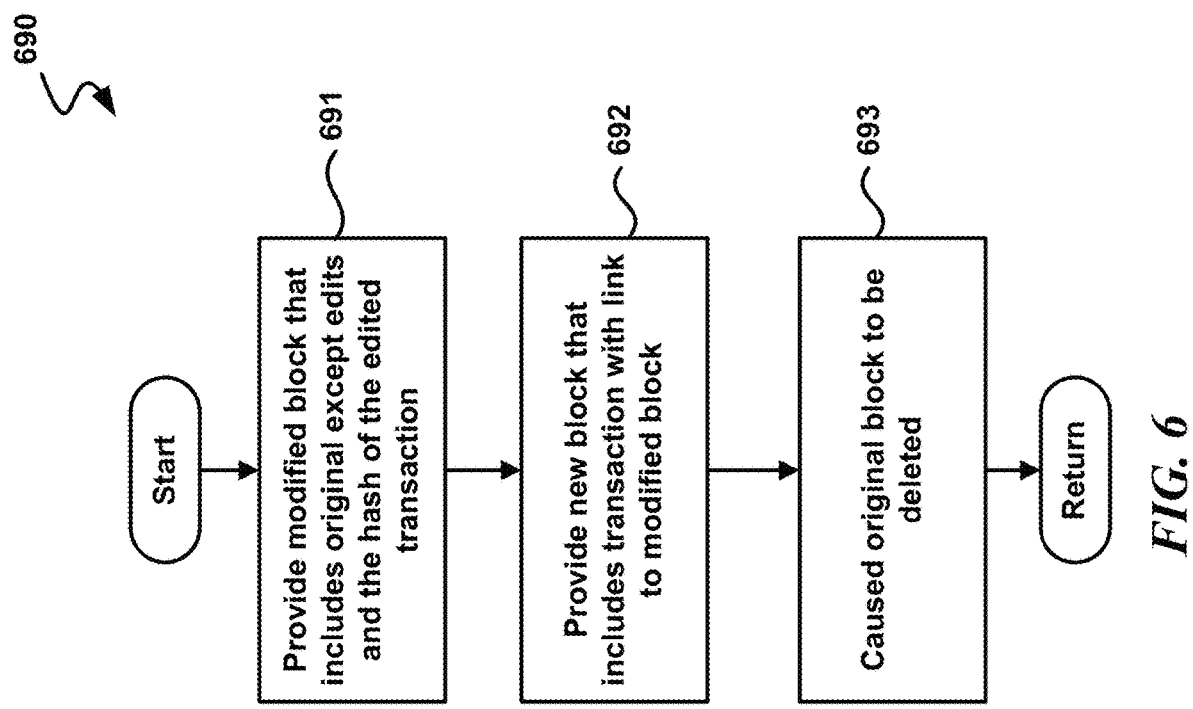
FIG. 6 is a diagram illustrating an example process for an edit blockchain transaction, in accordance with aspects of the present disclosure.

FIG. 6 is a diagram illustrating an example dataflow for a process (690) for a blockchain system. In some examples, the process of FIG. 6 is performed by one or more miners. In the illustrated example, step 691 occurs first. At step 691, in some examples, a modified block is provided in response to at least an edit transaction that indicates a transaction in an original block in a blockchain. In some examples, the modified block includes: transactions of the original block except the indicated transaction, a hash of the indicated transaction, and a header that includes a link to a hash of a block that precedes the original block.

As shown, step 692 occurs next in some examples. At step 692, in some examples, a new block is provided. The new block may include a reference to the edit transaction, the reference including a link to the modified block.

As shown, step 693 occurs next in some examples. At step 693, in some examples, the original block is caused to be deleted. The processing may then proceed to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory adapted to store run-time data for the device, and at least one processor that is adapted to execute processor-executable code that, in response to execution, enables the device to perform actions, including:
in response to at least an edit transaction that indicates a transaction in an original block in a blockchain:
providing a modified block that includes: transactions of the original block except the indicated transaction, a hash of the indicated transaction, and a header that includes a link to a hash of a block that precedes the original block;
providing a new block that includes a reference to the edit transaction, the reference including a link to the modified block; and
causing the original block to be deleted.

2. The apparatus of claim 1, wherein the modified block further includes a merkle root of the original block.

3. The apparatus of claim 1, the actions further including verifying the edit transaction, including verifying that an associated governance system agrees to the edit transaction.

4. The apparatus of claim 1, wherein the edit transaction indicates the indicated transaction by listing a hash of the transaction to be edited in a body of the edit transaction.

5. The apparatus of claim 1, wherein the modified block includes an exact copy of the original block except for the portion of the original block edited by the edit transaction.

6. The apparatus of claim 1, wherein the new block includes a header, and wherein the reference further includes a hash of the header of the modified block and a hash of the header of the new block.

7. The apparatus of claim 1, wherein the modified block includes the header of the original block, including the hash of the original block and the merkle root of the original block.

8. A method, comprising:
in response to at least an edit transaction, wherein a first block precedes a second block on a blockchain, and wherein the edit transaction indicates a transaction in the second block:
creating a modified version of the second block that includes: transactions of the second block except the indicated transaction, a hash of the indicated transaction, and a header that includes a link to a hash of the first block;
creating a third block that includes a reference to the edit transaction, the reference including a link to the modified version of the second block; and
causing the second block to be deleted.

9. The method of claim 8, wherein the modified version of the second block further includes a merkle root of the second block.

10. The method of claim 8, further comprising verifying the edit transaction, including verifying that an associated governance system agrees to the edit transaction.

11. The method of claim 8, wherein the edit transaction indicates a transaction for editing by listing a hash of the transaction to be edited in a body of the edit transaction.

12. The method of claim 8, wherein the modified version of the second block includes an exact copy of the second block except for the portion of the second block edited by the edit transaction.

13. The method of claim 8, wherein the third block includes a standard header, and wherein the reference further includes a hash of the standard header of the modified version of the second block and a hash of the standard header of the third block.

14. The method of claim 8, wherein the modified version of the second block includes the header of the second block, including the hash of the second block and the merkle root of the second block.

15. A processor-readable storage medium, having stored thereon process-executable code that, upon execution by at least one processor, enables actions, comprising:
in response to at least an edit transaction that indicates a transaction in an original block in a blockchain:
generating a modified block that includes: transactions of the original block except the indicated transaction, a hash of the indicated transaction, and a header that includes a link to a hash of a block that precedes the original block; and
generating a new block that includes a reference to the edit transaction, the reference including a link to the modified block.

16. The processor-readable storage medium of claim 15, wherein the modified block further includes a merkle root of the original block.

17. The processor-readable storage medium of claim 15, the actions further comprising verifying the edit transaction, including verifying that an associated governance system agrees to the edit transaction.

18. The processor-readable storage medium of claim 15, wherein the modified block includes an exact copy of the original block except for the portion of the original block edited by the edit transaction.

19. The processor-readable storage medium of claim 15, wherein the new block includes a standard header, and wherein the reference further includes a hash of the standard header of the modified block and a hash of the standard header of the new block.

20. The processor-readable storage medium of claim 15, wherein the modified block includes the header of the original block, including the hash of the original block and the merkle root of the original block.

* * * * *